US008470136B2

(12) United States Patent
Publ et al.

(10) Patent No.: US 8,470,136 B2
(45) **Date of Patent: *Jun. 25, 2013**

(54) PARTS WASHER WITH RECYCLER ASSEMBLY

(75) Inventors: Rudy Publ, Glendale Heights, IL (US); David Kisela, Dublin, OH (US); Tim Rothwell, Dublin, OH (US); Greg Merz, Gahanna, OH (US); Gary Myers, New Albany, OH (US)

(73) Assignee: Safety-Kleen Systems, Inc., Richardson, TX (US)

( * ) Notice: Subject to any disclaimer, the term of this patent is extended or adjusted under 35 U.S.C. 154(b) by 617 days.

This patent is subject to a terminal disclaimer.

(21) Appl. No.: 12/698,739

(22) Filed: Feb. 2, 2010

(65) Prior Publication Data

US 2011/0186093 A1 Aug. 4, 2011

(51) Int. Cl.

| | |
|---|---|
| ***B01D 3/42*** | (2006.01) |
| ***B01D 5/00*** | (2006.01) |
| ***F16K 37/00*** | (2006.01) |
| ***B08B 3/00*** | (2006.01) |

(52) U.S. Cl.

USPC ....... 202/160; 134/56 R; 134/104.1; 134/109; 134/113; 137/384.2; 137/455; 137/559; 159/44; 159/901; 202/170; 202/185.3; 202/197; 202/206; 202/242; 203/1; 203/2; 203/98; 203/100

(58) Field of Classification Search

USPC ............... 137/384.2, 455, 558, 559; 202/160, 202/170, 181, 185.3, 197, 206, 242; 203/1, 203/2, 98, 100, DIG. 18; 134/56 R, 109, 134/113, 104.1; 159/44, 901; 220/663

See application file for complete search history.

(56) References Cited

U.S. PATENT DOCUMENTS 2,253,579 A * 8/1941 Phillips et al. ................ 202/170
2,713,973 A 7/1955 Hencken et al.

(Continued)

FOREIGN PATENT DOCUMENTS

CA 2277449 1/2001
CA 2317620 3/2002

(Continued)

OTHER PUBLICATIONS

Uni-ram Corporation website page. "Uni-ram is a World Leader in the manufacturing of Spray Gun Cleaners, Parts Washers and Solvent Recyclers" as viewed on Jun. 19, 2009. Link: http://www.uniram.com/company.html.

(Continued)

*Primary Examiner* — Virginia Manoharan
(74) *Attorney, Agent, or Firm* — Vedder Price P.C.

(57) ABSTRACT

An assembly for removing contaminants from objects and recycling a solvent from a contaminated solvent solution includes a parts washer assembly including a container for a contaminated solvent solution and a recycling assembly that includes a reservoir module connected to a recycler module. The reservoir module includes a mounted reservoir including an interior volume and a removable lid that reduces the interior volume and includes an access port. The recycler module includes a distillation assembly and an air handler assembly. The distillation assembly includes a distiller and a conduit including a condenser and a sight glass. The air handler assembly includes a duct having an intake port, an exhaust port and a source of air flow. The condenser is disposed within the duct and the sight glass is disposed external to the duct.

18 Claims, 11 Drawing Sheets

U.S. PATENT DOCUMENTS

| | | | | | |
|---|---|---|---|---|---|
| 2,860,088 | A * | 11/1958 | Plassmeyer | 202/170 |
| 2,867,225 | A * | 1/1959 | Zademach et al. | 134/109 |
| 3,070,463 | A * | 12/1962 | Barday | 134/11 |
| 3,079,286 | A * | 2/1963 | Kearney et al. | 134/12 |
| 3,106,928 | A * | 10/1963 | Burton | 134/79 |
| 3,156,248 | A | 11/1964 | Rand | |
| 3,352,310 | A | 11/1967 | Doyscher | |
| 3,434,881 | A | 3/1969 | Smith | |
| 3,483,092 | A | 12/1969 | Young | |
| 3,522,814 | A | 8/1970 | Olson | |
| 3,593,729 | A | 7/1971 | Goldware | |
| 3,598,651 | A | 8/1971 | Valvaara | |
| 3,601,135 | A | 8/1971 | Marlow | |
| 4,025,363 | A | 5/1977 | DeSantis | |
| 4,056,114 | A | 11/1977 | Boutillette | |
| 4,128,478 | A | 12/1978 | Metzger | |
| 4,261,378 | A | 4/1981 | Otzen | |
| 4,289,586 | A | 9/1981 | Sabatka | |
| 4,299,664 | A * | 11/1981 | Smith | 202/170 |
| 4,443,269 | A | 4/1984 | Capella et al. | |
| 4,601,181 | A * | 7/1986 | Privat | 68/18 C |
| D287,394 | S | 12/1986 | Yamamoto | |
| 4,630,625 | A | 12/1986 | Capella et al. | |
| 4,653,661 | A | 3/1987 | Buchner et al. | |
| 4,723,066 | A | 2/1988 | Kurokawa et al. | |
| 4,785,836 | A | 11/1988 | Yamamoto | |
| 4,824,487 | A | 4/1989 | Heffernan | |
| 4,858,632 | A | 8/1989 | Jay, Jr. et al. | |
| 4,917,807 | A | 4/1990 | Prisco, Jr. | |
| 4,929,312 | A | 5/1990 | Westcott | |
| 4,955,403 | A | 9/1990 | Zappa et al. | |
| 4,976,825 | A | 12/1990 | Iwasaki et al. | |
| 5,015,337 | A * | 5/1991 | Fraser | 202/169 |
| 5,035,281 | A * | 7/1991 | Neuenfeldt et al. | 165/76 |
| 5,102,504 | A | 4/1992 | Saito | |
| 5,183,066 | A | 2/1993 | Hethcoat | |
| 5,203,099 | A | 4/1993 | Naranjo et al. | |
| 5,213,117 | A | 5/1993 | Yamamoto | |
| 5,240,507 | A | 8/1993 | Gray et al. | |
| 5,277,208 | A | 1/1994 | Mansur | |
| 5,308,452 | A * | 5/1994 | Marks et al. | 202/164 |
| 5,348,623 | A | 9/1994 | Salmon | |
| 5,349,974 | A | 9/1994 | Mansur | |
| 5,360,133 | A | 11/1994 | Corby et al. | |
| 5,388,601 | A | 2/1995 | Mansur | |
| 5,415,193 | A | 5/1995 | Taricco | |
| 5,469,876 | A | 11/1995 | Gray et al. | |
| 5,492,138 | A | 2/1996 | Taricco | |
| 5,503,681 | A | 4/1996 | Inada et al. | |
| 5,518,013 | A | 5/1996 | Mansur | |
| 5,549,128 | A | 8/1996 | Mansur | |
| 5,575,199 | A | 11/1996 | Yamamoto | |
| 5,579,704 | A | 12/1996 | Mansur | |
| 5,669,401 | A | 9/1997 | Mansur | |
| 5,698,774 | A * | 12/1997 | Osmanski | 73/61.43 |
| 5,741,365 | A | 4/1998 | Inada et al. | |
| 5,748,547 | A | 5/1998 | Shau | |
| 5,769,912 | A | 6/1998 | Mansur | |
| 5,825,704 | A | 10/1998 | Shau | |
| 5,827,374 | A | 10/1998 | Mansur | |
| 5,836,201 | A | 11/1998 | Drew et al. | |
| 5,845,661 | A | 12/1998 | Leppo | |
| 5,876,567 | A | 3/1999 | Yamamoto et al. | |
| 5,907,887 | A | 6/1999 | Mansur | |
| 5,911,341 | A | 6/1999 | Donselman et al. | |
| 5,930,459 | A | 7/1999 | Eckman et al. | |
| 5,968,321 | A | 10/1999 | Sears | |
| 6,108,229 | A | 8/2000 | Shau | |
| 6,128,438 | A | 10/2000 | Kim | |
| 6,148,851 | A | 11/2000 | Friedline et al. | |
| 6,161,560 | A | 12/2000 | Brink | |
| 6,216,246 | B1 | 4/2001 | Shau | |
| 6,227,214 | B1 | 5/2001 | Mansur | |
| 6,279,587 | B1 | 8/2001 | Yamamoto | |
| 6,343,045 | B2 | 1/2002 | Shau | |
| D455,813 | S | 4/2002 | Mount | |
| 6,367,489 | B1 | 4/2002 | Yamamoto | |
| 6,404,670 | B2 | 6/2002 | Shau | |
| 6,504,745 | B2 | 1/2003 | Shau | |
| 6,563,758 | B2 | 5/2003 | Shau | |
| 6,572,831 | B1 * | 6/2003 | Nicola | 422/256 |
| 6,606,275 | B2 | 8/2003 | Shau | |
| 6,608,780 | B2 | 8/2003 | Shau | |
| 6,674,660 | B2 | 1/2004 | Shau | |
| 6,687,148 | B2 | 2/2004 | Shau | |
| 6,829,180 | B2 | 12/2004 | Shau | |
| 7,064,376 | B2 | 6/2006 | Shau | |
| D525,003 | S | 7/2006 | Mount et al. | |
| 7,180,338 | B2 | 2/2007 | Shau | |
| 7,187,855 | B2 | 3/2007 | Kaastra | |
| 7,217,343 | B2 | 5/2007 | Land | |
| 7,258,765 | B2 | 8/2007 | Westcott | |
| 7,368,038 | B2 | 5/2008 | Mount | |
| D572,869 | S | 7/2008 | Mount et al. | |
| 7,531,065 | B2 | 5/2009 | Yamamoto | |
| 2002/0007814 | A1 | 1/2002 | Mansur | |
| 2002/0092758 | A1 | 7/2002 | Zebuhr | |
| 2003/0053330 | A1 | 3/2003 | Shau et al. | |
| 2004/0003990 | A1 | 1/2004 | Mansur | |
| 2004/0103933 | A1 | 6/2004 | Mansur | |
| 2005/0036363 | A1 | 2/2005 | Shau | |
| 2005/0098424 | A1 | 5/2005 | Mount | |
| 2007/0170049 | A1 | 7/2007 | Mansur | |
| 2009/0114521 | A1 | 5/2009 | Harland et al. | |
| 2009/0159102 | A1 | 6/2009 | Mount et al. | |
| 2009/0159419 | A1 | 6/2009 | Mount et al. | |
| 2011/0120496 | A1 * | 5/2011 | Obidi | 134/10 |

FOREIGN PATENT DOCUMENTS

| | | | |
|---|---|---|---|
| CA | 2413438 | | 6/2004 |
| CA | 2507866 | | 6/2004 |
| CA | 2455182 | | 7/2005 |
| EP | 1200166 | A2 | 5/2002 |
| EP | 1315544 | A2 | 6/2003 |
| EP | 1567240 | A1 | 8/2005 |
| JP | 2003504177 | | 2/2003 |
| WO | 01003810 | A2 | 1/2001 |
| WO | 02020114 | A2 | 3/2002 |
| WO | 03018218 | A1 | 3/2003 |
| WO | 2004050206 | A1 | 6/2004 |
| WO | 2005068220 | A1 | 7/2005 |
| WO | 2008084327 | A2 | 7/2008 |
| WO | 2009062079 | A1 | 5/2009 |
| WO | 2009062088 | A1 | 5/2009 |
| WO | 2009062088 | A9 | 9/2009 |

OTHER PUBLICATIONS

Uni-ram Corporation website page. "Uni-ram Automotive manufactures environmentally friendly equipment for collision repair shops. Equipment includes spray gun cleaners, recyclers for solvents and water cleaners, trash compactors and vacuums" as viewed on Jun. 19, 2009. Link: http://www.uniram.com/company-auto.html.

Uni-ram Corporation website page. "Solvent Recyclers for the Automotive Industry Contribute to the "Greening" of Your Community with Uni-ram's Environmentally Friendly Products" as viewed on Jun. 19, 2009. Link: http://www.uniram.com/solvent_recycler-auto.html.

Uni-ram Corporation website page. "KleenGIANT 34SL Series Parts Cleaner with Automatic Solvent Recycling" as viewed on Jun. 19, 2009. Link: http://www.uniram.com/34sl.html.

* cited by examiner

PARTS WASHER WITH RECYCLER ASSEMBLY

FIELD OF THE DISCLOSURE

The present disclosure is related to an assembly for recycling a contaminated solvent solution.

BACKGROUND

Conventional solvent recycling units, especially those used in connection with parts washers have several disadvantages. Notably, such recycling units produce malodors during operation of the distillation cycle. Additionally, solvent recycling through part of such recycling units is commonly fixed. As a result, separate different recycling units are required to be designed in order to operate in connection with each recycling unit that has a different reservoir capacity. Further, such recycling units are difficult to service in a cost-effective and time-efficient manner. Moreover, such recycling units are operationally inefficient with respect to air handling, solvent distillation and waste collection and removal assemblies. Therefore, there exists a need in the art that overcomes the disadvantages briefly mentioned herein, among others, and provides novel solutions.

BRIEF DESCRIPTION OF THE DRAWINGS

The following disclosure as a whole may be best understood by reference to the provided detailed description when read in conjunction with the accompanying drawings, drawing description, abstract, background, field of the disclosure, and associated headings. Identical reference numerals when found on different figures identify the same elements or a functionally equivalent element. The elements listed in the abstract are not referenced but nevertheless refer by association to the elements of the detailed description and associated disclosure.

DETAILED DESCRIPTION

The present invention is not limited to the particular details of the apparatus depicted, and other modifications and applications may be contemplated. Further changes may be made in the device without departing from the true spirit of the scope of the invention herein involved. It is intended, therefore, that the subject matter in this disclosure should be interpreted as illustrative, not in a limiting sense.

Figure 1:
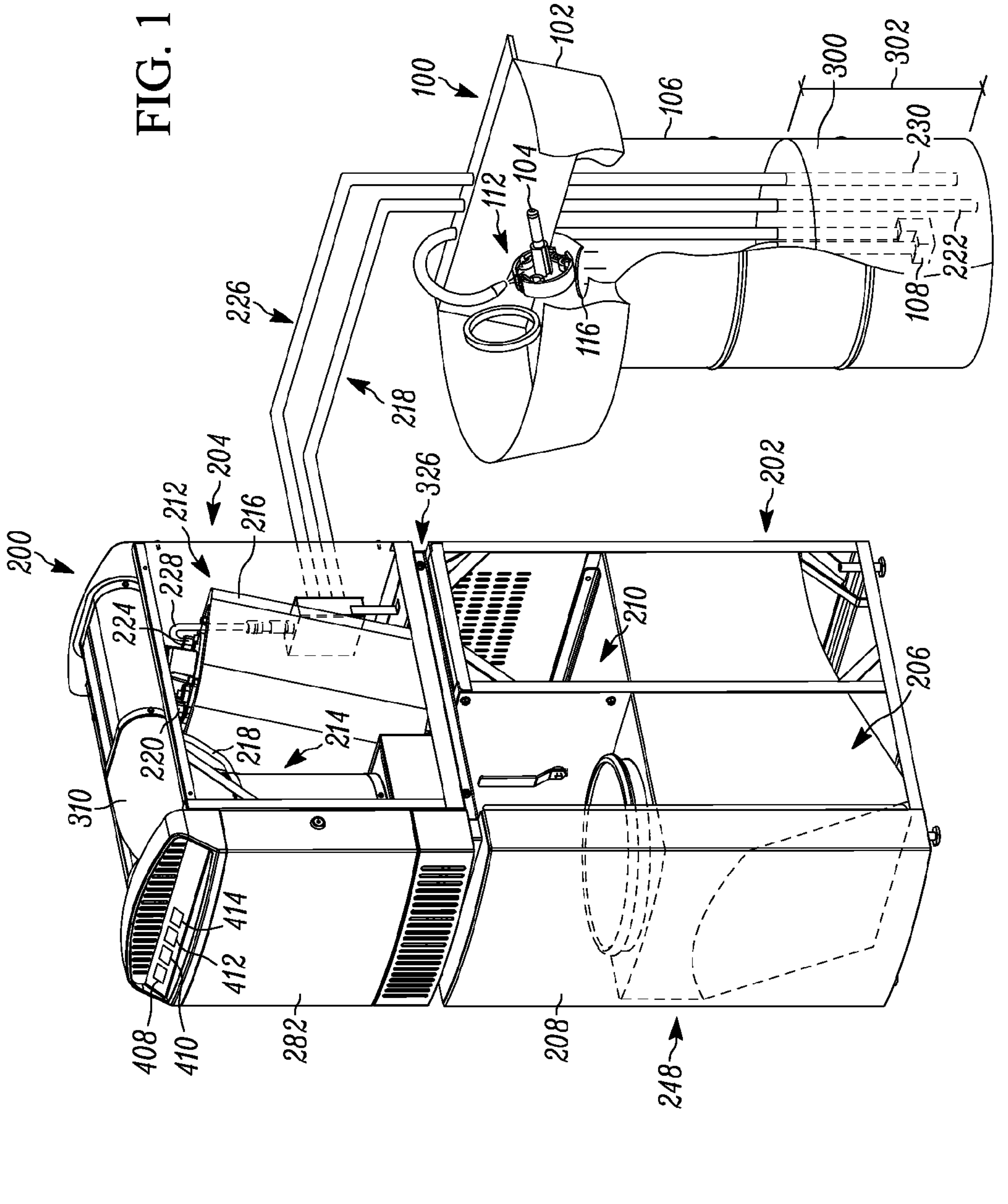
FIG. 1 is a perspective view of an assembly for recycling a solvent from a contaminated solvent solution in accordance with one embodiment of the present disclosure, with certain components removed for clarity, and a source of the contaminated solvent solution, partially cut away for clarity.

FIG. 1 is a perspective view of an assembly 200 for recycling a solvent from a contaminated solvent solution in accordance with one embodiment of the present disclosure, with certain components removed for clarity, and a source 100 of a contaminated solvent solution 300, partially cut away for clarity. It is within the teachings of the present disclosure that the source 100 of the contaminated solvent solution 300, may take any of a number of various forms. For example, the source 100 may be a parts washer assembly that is commonly referred to as a sink-on-drum parts washer that includes a sink or portion that is disposed atop a drum or container and the remainder of the structure and associated functionality is more fully detailed in U.S. Pat. No. 3,522,814, that is commonly owned and wholly incorporated herein by reference. The present disclosure will describe the parts washer assembly above as but one embodiment of the source 100. However, one of ordinary skill in the art will recognize that any other assembly or device that is used to clean mechanical parts or objects to remove contaminants or that has or uses a container for contaminated solvent solution shall be considered as a source 100 of contaminated solvent solution 300 and an equivalent to the parts washer assembly 100 without limitation.

The parts washer assembly 100, in one embodiment, includes a portion 102 for removing contaminants from objects 104 that is connected to and in communication with a container 106 for the contaminated solvent solution 300. The contaminated solvent solution 300 is disposed in the container 106 at a level 302. One of ordinary skill in the art will recognize that the level is generally measured from the bottom of the container 106, as shown. However, it is within the teachings of the present disclosure that the level 302 may be measured or quantified in any other suitable manner in order to perform or satisfy the intended purpose. It is within the further teachings of the present disclosure that the expression contaminated solvent solution shall include both fresh or pure solvent and a solution of solvent and contaminants. The contaminants may have been removed from the objects or otherwise introduced into the solvent to form the contaminated solvent solution and, one of ordinary skill in the art will recognize that such contaminants may include solids, metals, soils, sludge, liquids, oils, greases, grime, sulfur compounds, halogenated compounds, amines, fatty acids and any other substance that may be considered to be a contaminate that may form a solution with a solvent. It is within the still further teachings of the present disclosure that the solvent may be any suitable solvent applicable to perform or satisfy the intended purpose. For example, in one embodiment, hydrocarbon-based solvents have been found to be successful in removing contaminants from mechanical parts and other solvents, such as, petroleum-based, N-Methyl-2-pyrrolidone (NMP), Butanone (methyl ethyl ketone or MEK), QSOL, or any other suitable solvent may be likewise successful for the intended purposes. The level 302 may change based on any number of reasons, such as, activation of a pump in the parts washer assembly 100 that moves the contaminated solvent solution 300 from the container 106 to the portion 102 and is returned to the container 106 by a drain, evaporation of the solvent, spillage, carry-off, drag-out or absorption of the contaminated solvent solution or any other reason.

In one embodiment, the recycling assembly 200 for the contaminated solvent solution 300 includes a reservoir module 202 and a recycler module 204. Preferably, the recycler module 204 is removably connected to the reservoir module 202. It is within the teachings of the present disclosure that such removable connection may take any suitable form. For example, such removable connection may be made by fasteners, latches, hooks, slots, complementary projection or configuration and receptacle, any combination of the foregoing or any other suitable connection structure.

The reservoir module 202, in one embodiment, includes a removably mounted reservoir 206. It is within the teachings of the present disclosure that such removable mounting may take any suitable form. For example, such removable connection may be made by fasteners, latches, hooks, slots, complementary projection or configuration and receptacle, any combination of the foregoing or any other suitable connection structure. In one embodiment, the reservoir module 202 includes a door 208 that is movable from a first orientation, as shown in FIG. 1 that prevents access to an interior 210 of the reservoir module 202, to a second orientation, not shown in FIG. 1, but see FIG. 11, that permits access to the interior 210 of the reservoir module 202. It is within the teachings of the present disclosure that the second orientation may be an open position as commonly understood with respect to a pivoting door, a removed position as may be commonly understood with respect to a removable panel or any other suitable orientation.

The recycler module 204, in one embodiment, includes a distillation assembly 212 and an air handler assembly 214. The distillation assembly 212, in one embodiment, includes a distiller 216 and a conduit 218 connected to the distiller 216 at a first end 220 and the container 106 for the contaminated solvent solution 300 at a second end 222. It is within the teachings of the present disclosure that connection of the conduit 218 to the container 106 shall include any form of physical connection between the second end 222 of the conduit 218 and the container 106, as well as, any manner of disposing the second end 222 of the conduit 218 within the container 106, provided that in both examples the second end 222 is disposed below the level 302. The distillation assembly 212, in one embodiment, includes a pressure relief valve 224 connected to the distiller 216. Preferably, the pressure relief valve 224 is in direct communication with a distillation chamber defined within the distiller 216, as described in more detail below, and a tube 226 is connected at a first end 228 to the pressure relief valve 224 and at a second end 230 to the container 106 for the contaminated solvent solution 300. It is within the teachings of the present disclosure that connection of the tube 226 to the container 106 shall include any form of physical connection between the second end 230 of the tube 226 and the container 106, as well as, any manner of disposing the second end 230 of the tube 226 within the container 106, provided that in both examples the second end 230 is disposed below the level 302.

Figure 2:
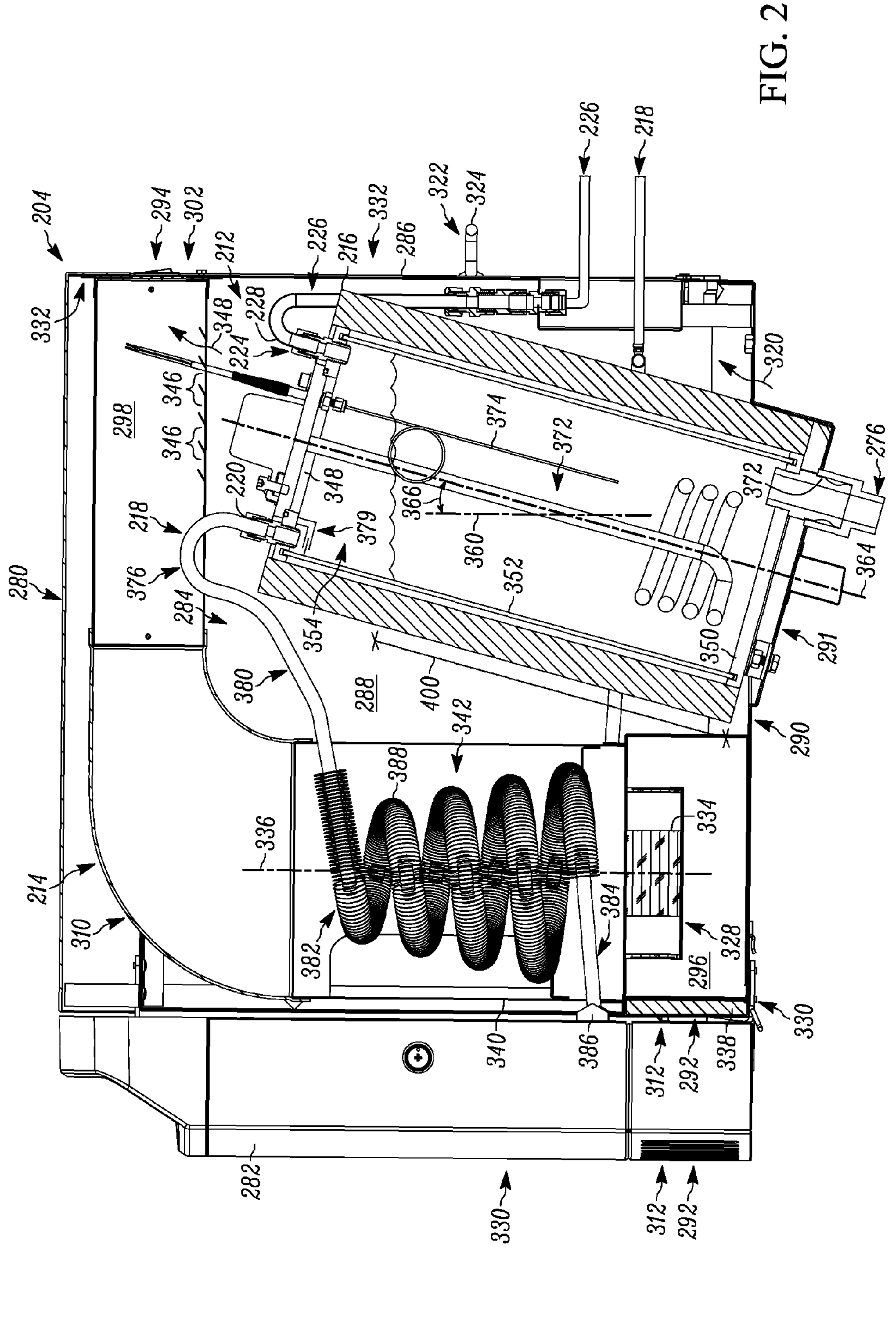
FIG. 2 is a side elevation view of the assembly for recycling the contaminated solvent solution of FIG. 1, with certain components removed and partially in cross-section for clarity.
Figure 4:
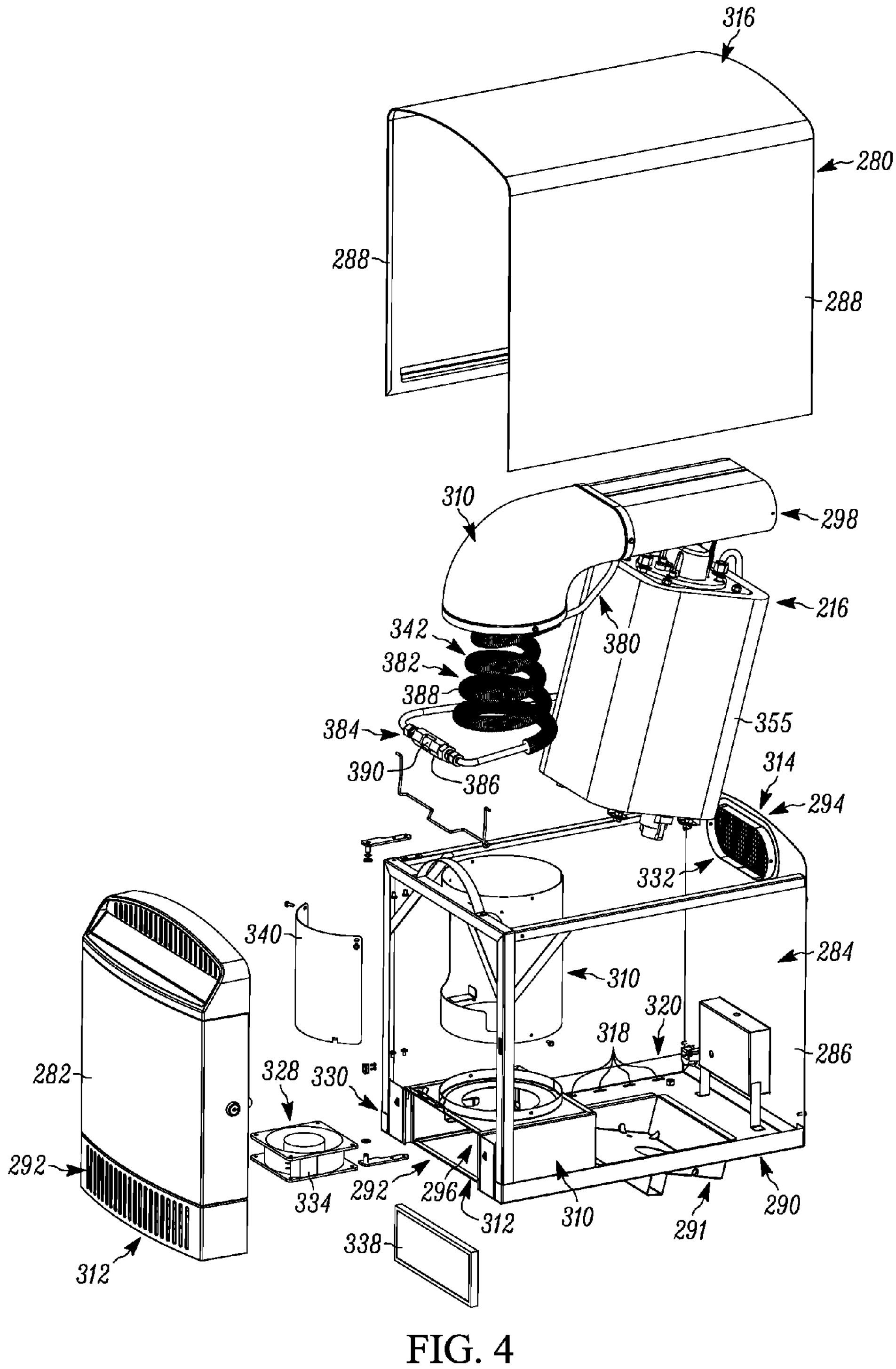
FIG. 4 is an exploded view of a recycler module.
Figure 5:
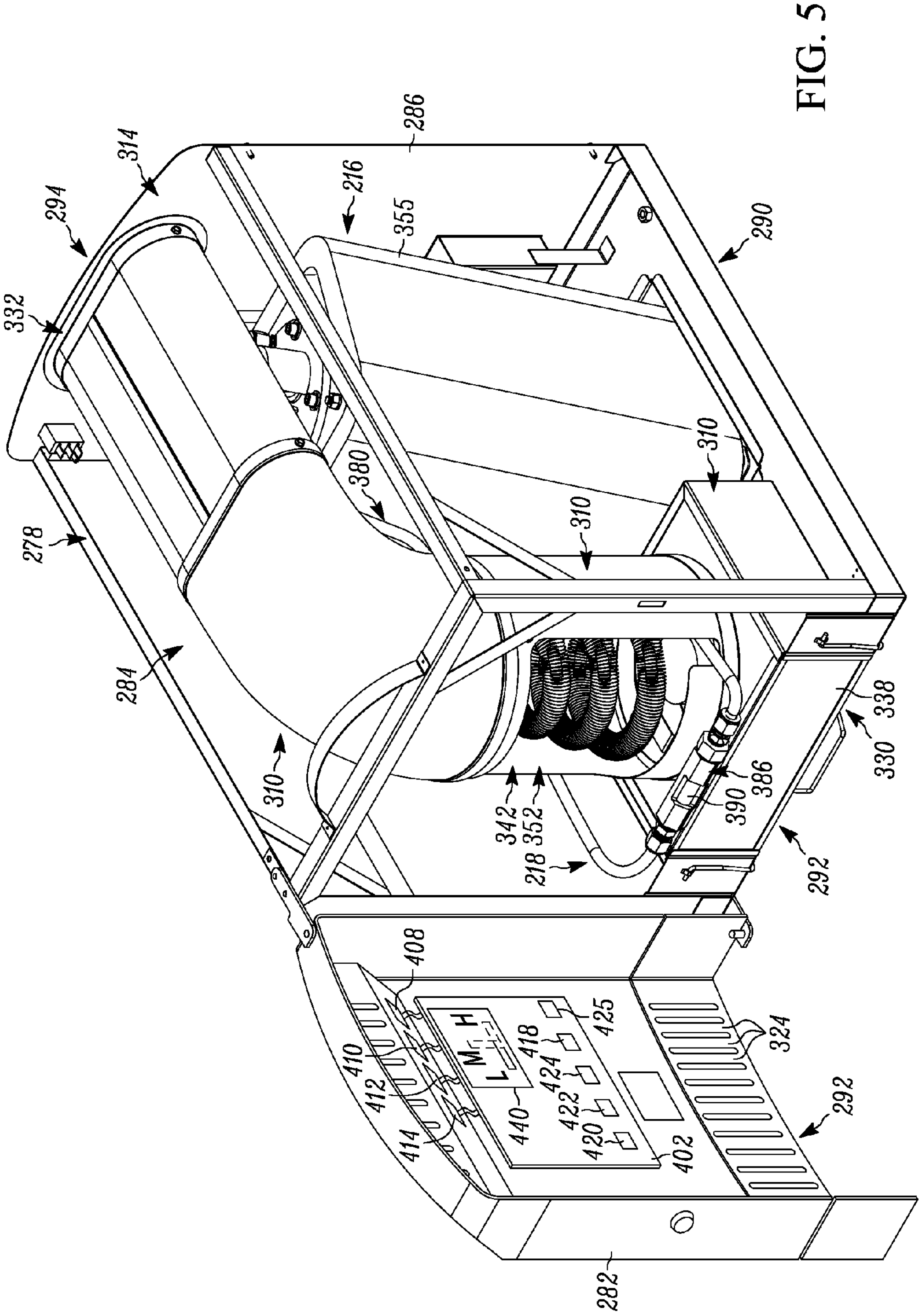
FIG. 5 is a perspective view of the recycler module, with certain components removed for clarity.

In one embodiment, the air handler assembly 214 may include a duct 310 having an intake port 296 and an exhaust port 298 and a source of air flow 328 connected to the duct 310, as shown in FIGS. 2, 4 and 5. It is within the teachings of the present disclosure that the intake port 296 and the exhaust port 298 may be disposed on or about the recycler module 204 in any suitable location or orientation. For example, in one preferred embodiment, the intake port 296 may be disposed at a front 330 of the recycler module 204 the exhaust port 298 may be disposed at a back 332 or the recycler module 204.

FIG. 2 is a side elevation view of the assembly 200 for recycling the solvent from the contaminated solvent solution 300 of FIG. 1, with certain components removed and partially in cross-section for clarity. The recycling assembly 200 for the contaminated solvent solution 300, in one embodiment, includes the reservoir module 202 that is removably and fluidly connected to the recycler module 204, such as, for example only, a quick-disconnect fluid coupling disposed between the reservoir module 202 and the recycler module 204, as described herein or any other suitable connection. It is within the teachings of the present disclosure that the recycler module 204 may be removably connected to the reservoir module 202 in any suitable manner to perform the intended functionality. For example, mechanical clips, mechanical fasteners or any other suitable structure may be used to perform the intended functionality of a secure and removable connection.

Figure 3:
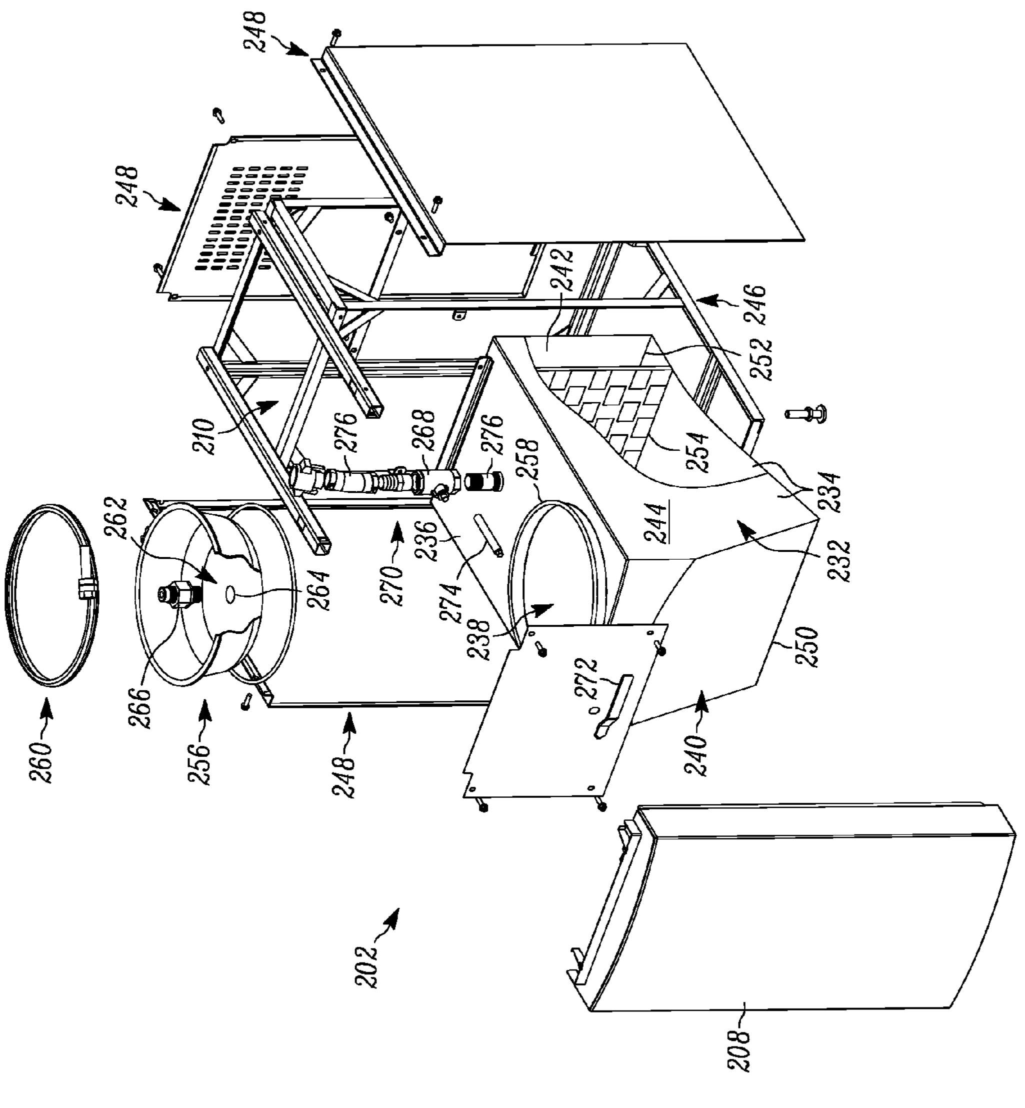
FIG. 3 is an exploded view of a reservoir module.

As shown in FIGS. 2 and 3 (an exploded view of the reservoir module 202), the reservoir module 202, in one embodiment, includes the removably mounted reservoir 206 disposed therein. It is within the teachings of this disclosure that such removable mounting may have any suitable structural configuration to perform in the intended functionality. For example, the reservoir may be disposed within and supported by the frame 246 and movably secured to the frame 246 with removable mounting fasteners. Generally, the reservoir module 202 may be formed from a frame 246, a cover 248 that is connected to the frame 246 and forms the exterior surface of the reservoir module 202 and the door 208 that is connected to the frame 246 in accordance with the teachings above for selectable access to the interior 210, all cooperatively define the interior 210 of the reservoir module 202. It is within the teachings of the present disclosure that the frame 246 may be constructed from any suitable material and in any known manner. For example, the frame 246 may be constructed from component pieces or a monolithic construction, and stamping, forming, welding, mechanical fasteners, molding, bonding or other methods of construction may be used in connection with metal, plastic, composite materials or other like suitable materials. In one embodiment, the frame 246 is formed from component pieces made of metal, preferably carbon steel or other like suitable material, connected by welding or mechanical fasteners. It is further within the teachings of the present disclosure that the cover 248 may be constructed from any suitable material and connected to the frame 246 in any known manner. For example, the cover 248 may be constructed from component pieces or a monolithic construction, and stamping, forming, welding, mechanical fasteners, molding, bonding or other methods of construction many be used in connection with metal, plastic, composite materials or other like materials. In one embodiment, the cover 248 is formed from component pieces made of metal, preferably carbon steel, galvanized steel or other like suitable material connected to the frame by welding or mechanical fasteners. It is still further within the teachings of the present disclosure that the door 208 may be constructed from any suitable material and connected to the frame 246 in any known manner. For example, the door 208 may be constructed from component pieces or a monolithic construction, and any method of connection to the frame to facilitate the purposes and functions described herein may be used. In one embodiment, the door 208 is formed as a monolithic piece made of metal, preferably carbon steel, galvanized steel or other like suitable material, or plastic connected to the frame in any suitable manner described above to facilitate the purposes and functions described herein.

In one embodiment, the reservoir 206 includes a side wall 232, a bottom wall 234 and a top wall 236 that cooperatively define an interior volume 238. It is within the teachings of the present disclosure that the reservoir 206 may be constructed from any suitable material and in any known manner. For example, the reservoir 206 may be constructed from component pieces or a monolithic construction, and stamping, forming, welding, mechanical fasteners, molding, bonding or other methods of construction may be used in connection with metal, plastic, composite materials or other like materials. In one embodiment, the reservoir 206 is formed from component pieces of carbon steel that are welded together or from a monolithic piece of suitable plastic that is molded to form a liquid-tight container. The side wall 232, in one embodiment, includes a front portion 240, a back portion 242 and opposing side portions 244. The back portion 242 and opposing side portions 244 are disposed in a plane that is oriented generally vertical. However, a substantial element of the front portion 240, in particular, that element of the front portion 240 that is disposed adjacent a front edge 250 of the bottom wall 234, is disposed in a non-vertical orientation and substantially normal to the bottom wall 234. Such orientation facilitates the easy service of the assembly 200 as described further herein. The bottom wall 234 also includes a back edge 252 that is disposed adjacent the back portion 242 of the side wall 232. In one embodiment, the back edge 252 is disposed above the front edge 250 in order to facilitate the operation and easy service of the assembly 200 as described further herein. Additionally, in one embodiment, the bottom wall 234 may have a configuration characterized by an inclined, arcuate, planar or combination of the foregoing descriptions. Optionally, a baffle 254 may be disposed within the interior volume 238 of the reservoir 206 to reduce sloshing, spilling or any other undesirable movement of the contaminated solvent solution and/or contaminants disposed therein and/or to define a tortuous path to keep solids out of the distillation chamber. It is within the teachings of the present disclosure that the baffle 254 may be constructed of any suitable material and in any manner as commonly known for the intended purpose and functionality.

In one embodiment, the reservoir 206 may further include a lid 256 that is removably connected to an opening 258 formed in the top wall 236 of the reservoir 206. It is within the teachings of the present disclosure that the lid 256 may be constructed from any suitable material and in any known manner. For example, the lid 256 may be constructed from component pieces or a monolithic construction, and stamping, forming, welding, mechanical fasteners, molding, bonding or other methods of construction may be used in connection with metal, plastic, composite materials or other like materials. In one embodiment, the lid 256 is a monolithic piece of metal, preferably carbon steel, galvanized steel or other like suitable material, or plastic that is formed into the desired configuration to perform the intended functionality. Optionally, the lid 256 may include a connector 260 that selectively secures the lid 256 in a known liquid-tight manner to the opening 258. It is within the teachings of the present disclosure that the connector 260 may be constructed from any suitable material and in any known manner. For example, the connector 260 may be constructed from component pieces or a monolithic construction, and stamping, forming, welding, mechanical fasteners, bonding or other methods of construction may be used. In one embodiment, the connector 260 is preferably constructed of monolithic component pieces that are commonly cooperatively referred to as a quick-release barrel clamp ring.

In one embodiment, the lid 256 may include a first portion 262 that extends below the top wall 236 into the interior volume 238. As a result, the interior volume 238 is reduced such that a level of the contaminated solvent solution 300 disposed in the reservoir 206 is decreased upon removal of the lid 256 from the reservoir 206. It is within the teachings of the present disclosure that the first portion 262 generally displaces an amount of volume at least roughly equivalent to a device that is inserted into the interior volume 238 during servicing of the assembly 200 as further described herein, so as to avoid spilling the contaminants and/or contaminated solvent solution 300 in the reservoir 206 during servicing. Optionally, the lid 256 may further include an access port 264 disposed in the first portion 262 including a coupling 266 connected thereto. It is within the teachings of the present disclosure that the coupling 266 may be constructed from any suitable material and in any known manner. For example, in one embodiment, the coupling 266 is configured as a quick-disconnect fluid-tight coupling. One of ordinary skill in the art will recognize that any other suitable construction or configuration of the coupling 266 may be used to perform the intended functionality.

In one embodiment, the reservoir 206 may further include a safety lock-out assembly 270 that may include a conduit 276 connected to the reservoir 206 and the distiller 216, a valve 268 connected to the conduit 276, a standoff 274 connected to the valve 268 and a handle 272 connected to the standoff 274. Preferably, the conduit 276 is connected to the top wall 236 of the reservoir 206 and is substantially vertically aligned to facilitate contaminate removal from the distiller 216 into the reservoir 206. It is within the teachings of the present disclosure that the valve 268 may be constructed from any suitable material and in any known manner. For example, in one embodiment, the valve 268 is configured as a conventional liquid-tight ball valve. One of ordinary skill in the art will recognize that any other suitable construction or configuration of the valve 268 may be used to perform the intended functionality. In one embodiment, the standoff 274 and handle 272 are preferably configured to interfere with the removal of the lid 256 when the handle 272 is disposed in a certain orientation, as further described herein. Thereby performing a safety function of preventing injury to an operator if the lid 256 could be removed when the assembly 200 is in a recycle mode, as described herein. The handle 272 is moveable to control the valve 268 between a first operative or recycle orientation, otherwise referred to as an open position (shown in FIG. 1), and a second operative or service orientation, otherwise referred to as a closed position (shown in FIGS. 3 and 11). When the valve 268 is disposed in the open position, such that the reservoir 206 is in communication with the distiller 216 (through the conduit 276 and valve 268), the handle 272 is disposed so as to interfere with the lid 256 so that the lid 256 cannot be easily removed from the reservoir 206. However, when the valve 268 is disposed in the closed position, such that the reservoir 206 is not in communication with the distiller 216 (the valve 268 closes the conduit 276), the lid 256 can be more easily removed from the reservoir. The lock-out assembly 270 is also useful in a step of the method of servicing the assembly 200 as described herein.

As shown in FIGS. 2, 4 (an exploded view of the recycler module 204) and 5 (a perspective view of the recycler module 204, with certain components removed for clarity), the recycler module 204, preferably includes the distillation assembly 212 and the air handler assembly 214. Generally, the recycler module 204 may be formed from a frame 278, a cover 280 that is connected to the frame 278 and forms an exterior surface of the recycler module 204 and a door 282 (that shall be considered to form part of the cover 280) that is connected to the frame 278, that all cooperatively define an interior 284 of the recycler module 204. In one embodiment, the door 282 is movable from a first orientation, as shown in FIGS. 1, 2 and 4 that prevents access to the interior 284 of the recycler module 204, to a second orientation, shown in FIG. 5 that permits access to the interior 284 of the recycler module 204. Additional functionality associated with the movement of the door 282 is described herein. It is within the teachings of the present disclosure that the second orientation may be an open position as commonly understood with respect to a pivoting door, a removed position as may be commonly understood with respect to a removable panel or any other suitable orientation. Preferably, the door 282 is pivotally connected to the frame 278 to move through an arc between the first and second orientations as described herein. It is within the teachings of the present disclosure that the frame 278 may be constructed from any suitable material and in any known manner. For example, the frame 278 may be constructed from components pieces or a monolithic construction, and welding, mechanical fasteners, bonding or other connection methods many be used. In one embodiment, the frame 278 is formed from component pieces made of metal, preferably carbon steel, galvanized steel or other like suitable material, or plastic connected by welding or mechanical fasteners. It is further within the teachings of the present disclosure that the cover 280 may be constructed from any suitable material and connected to the frame 278 in any known manner. For example, the cover 280 may be constructed from component pieces or a monolithic construction, and stamping, forming, welding, mechanical fasteners, molding, bonding or other methods of construction many be used in connection with metal, plastic, composite materials or other like materials. In one embodiment, the cover 280 is formed from component pieces made of metal, preferably carbon steel, galvanized steel or other like suitable material, or plastic connected to the frame by welding or mechanical fasteners, namely a front cover (otherwise referred to herein as the door 282), a back cover 286, side covers 288, a bottom wall 290 and a top cover 316. It is still further within the teachings of the present disclosure that the door 282 may be constructed from any suitable material and connected to the frame 278 in any known manner. For example, the door 282 may be constructed from component pieces or a monolithic construction, and stamping, forming, welding, mechanical fasteners, molding, bonding or other methods of construction many be used in connection with metal, plastic, composite materials or other like materials. In one embodiment, the door 282 is formed as a monolithic piece made of metal, preferably carbon steel, galvanized steel or other like suitable material, or plastic connected to the frame in any suitable manner described above to facilitate the purposes and functions described herein.

In one embodiment, the front cover or door 282 may have an inlet opening 292 formed therein and the back cover 286 may have an outlet opening formed therein. It is within the teachings of the present disclosure that the inlet and outlet openings 292, 294 are formed in any suitable manner. For example, the inlet and outlet openings 292, 294 may be formed by punching, molding, cutting or any other suitable forming method or technique. The inlet and outlet openings 292, 294, as will be described in more detail below, form a part of the air handler assembly 214. It is within the teachings of the present disclosure that the inlet and outlet openings 294 may be disposed in any location and in any orientation on the cover 280 in order to perform or provide the intended functionality. For example, in one embodiment, the inlet opening 292 may be disposed in a lower portion 312 of the front cover or door 282 and the outlet opening 294 may be disposed in an upper portion 314 of the back cover 286. Additionally, a protective element 322 may be disposed adjacent the inlet opening 292 and/or the outlet opening 294 in order to prevent objects or other items from entering either the inlet or outlet openings 292, 294. It is within the teachings of the present disclosure that the protective element 322 may be configured in any suitable manner to perform the intended functionality. For example, in one embodiment, with respect to the inlet opening 292, a series of bars 324 may be formed as part of or connected to the door 282; likewise, with respect to the outlet opening 294, a bar 324 may be formed as part of or connected to the back cover 286. One of ordinary skill in the art will recognize that the bar 324, in each instance, may also provide a protective zone such that the rate of airflow through the inlet and/or outlet openings 292, 294 is not reduced from the desired amount.

In one embodiment, the top cover 316 may be configured to define a crowned top surface. It is within the teachings of the present disclosure that each component of the cover may have any other suitable configuration. The crowned top cover 316 prevents spills from collecting, discourages operators of the assembly 200 from setting objects or other items atop the assembly 200 and improves the aesthetics of the assembly 200.

In one embodiment, the bottom wall 290 may include a slot 318 that defines a pathway 320 between an exterior of the recycler module and the interior 284 of the recycler module 204. Preferably, the slot 318 is defined, in part, by an external opening that is disposed in a channel 326 (see FIG. 1) defined between the reservoir module 202 and the recycler module 204. Accordingly, the channel 326 functions as a protective zone that prevent objects or other items from entering either the slot 318 and facilitates no reduction of the rate of airflow through the slot 318 from the desired amount. It is within the teachings of the present disclosure that a plurality of slots 318 may be formed in the bottom wall 290 or elsewhere in the recycler module 204 in order to provide the intended functionality.

In one embodiment, the air handler assembly 214 includes the duct 310 including the intake port 296 disposed at the front 330 of the recycler module 204, the exhaust port 298 disposed at the back 332 of the recycler module 204, the source of airflow 328 and an access panel 340. Preferably, the inlet and outlet openings 292, 294 are respectively disposed aligned in registration with the intake port 296 and the exhaust port 298 of a duct 310 in order to facilitate the desired rate of air flow through the duct 310. It is within the teachings of the present disclosure that the source of air flow 328 connected to the duct 310 may be configured in any suitable manner. For example, the source of air flow may be from a compressed air source, as is commonly found in locations where the assembly 200 may be used, or preferably, in one embodiment, may be an axial fan 334 disposed within the duct 310 at a desired location in order to perform the intended functionality. It is within the teachings of the present disclosure that the desired location for the fan 334 may be any suitable location. However, in one embodiment, the fan 334 is disposed adjacent the intake port 296 in a generally horizontal orientation, such that an axis of rotation 336 is defined through a center of the axial fan 334 that is oriented generally vertical. In one embodiment, a filter 338 may be removably disposed in the intake port 296 before the fan 334. It is within the teachings of the present disclosure that the filter may have any suitable configuration or construction in order to perform the intended functionality. In one embodiment, the access panel 340 is removably connected to the duct 310 adjacent the fan 334 in order to provide access to a condenser 342 disposed within the duct 310. See FIG. 5 where access panel 340 has been removed. It is within the teachings of the present disclosure that the panel 340 may have any suitable configuration or construction to perform the intended functionality. For example, the panel 340 may be pivotally connected to the duct 310 and overlap an opening 344 formed therein or, alternatively, the panel 340 may be removable in its entirety or the panel 340 may have any of the other configurations or constructions of the doors 208, 282. In one embodiment, the duct 310 may include an opening 346 disposed in the exhaust port 298 adjacent the outlet opening 294 to define a pathway 348 between the interior 284 of the recycler module 204 and the exterior of the recycler module 204. It is within the teachings of the present invention that the opening 346 may have any suitable configuration or construction. For example, the opening 346 may be a simple opening stamped, formed, molded, cut or otherwise created in the duct 310, have a louvered contour or shape or set forth as a series of openings 346. One of ordinary skill in the art will recognize that the preferred louvered contour draws air from the interior 284 of the recycler module 204 at a greater rate when the fan 334 is activated as opposed to when the fan 334 is not activated. Nevertheless, the preferred louvered contour facilitates movement of air out of the recycler module 204 regardless if the fan is activated 334, in part because of its location adjacent the top of the distiller 216. An ambient cooling passageway is cooperatively defined by the inlet pathway 320 and the outlet pathway 348.

Figure 6:
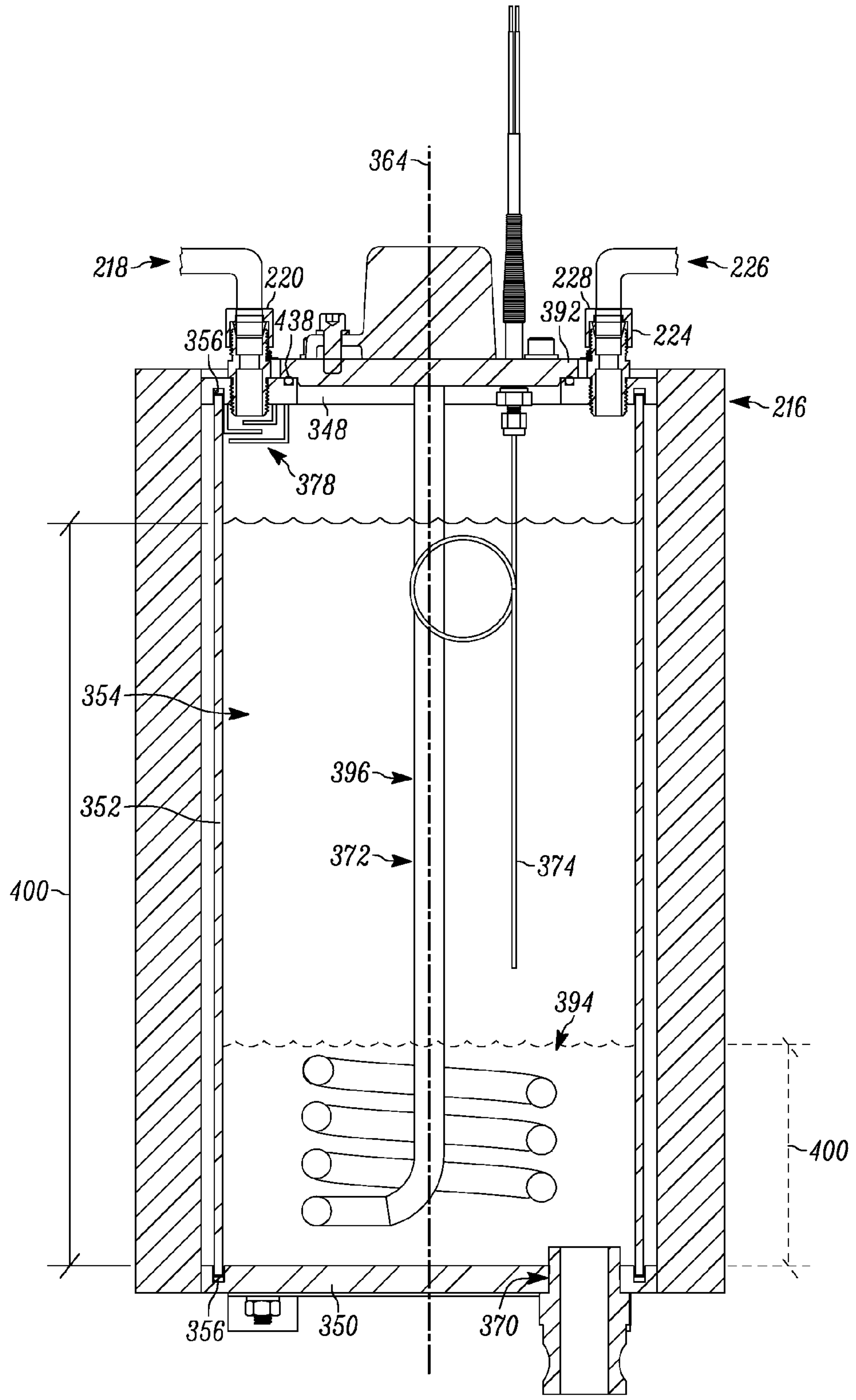
FIG. 6 is a detailed view of a distiller from FIG. 2.
Figure 7:
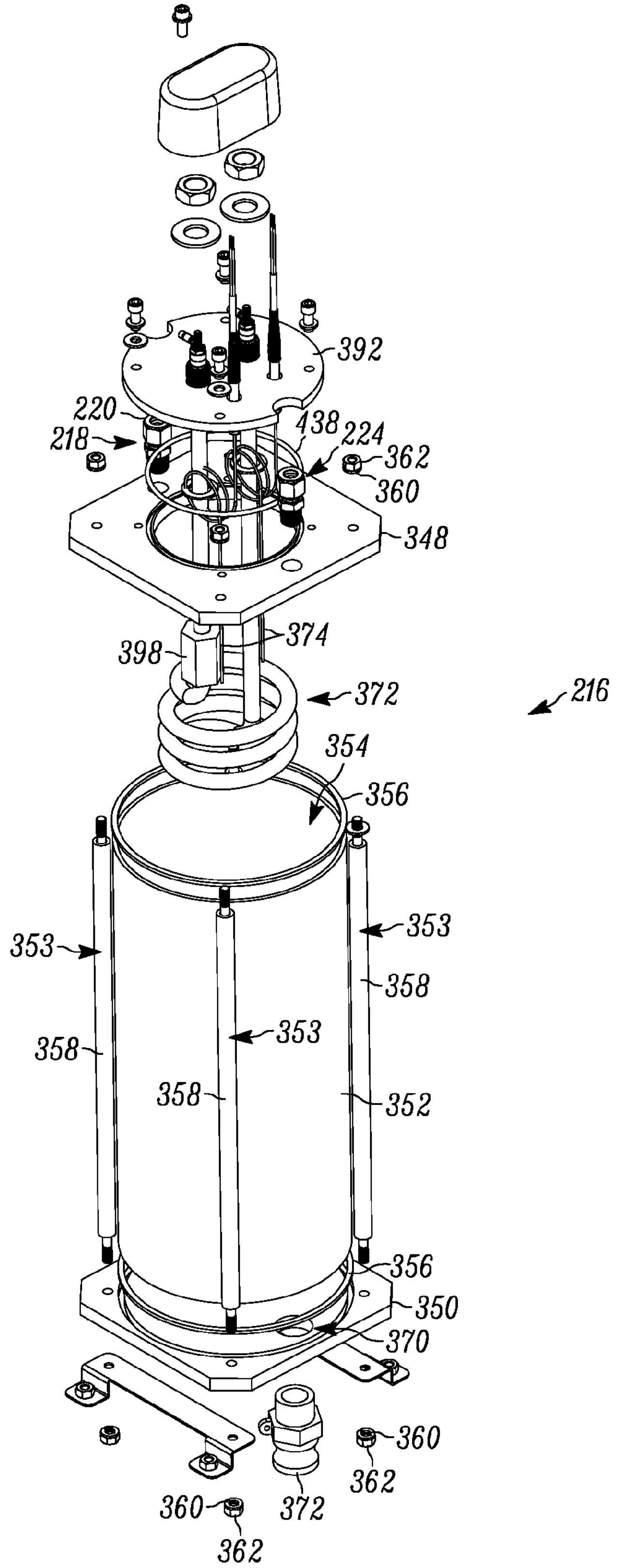
FIG. 7 is an exploded view of the distiller of FIG. 6.

As shown in FIGS. 6 (a detailed view of a distiller from FIG. 2) and 7 (an exploded view of the distiller of FIG. 6), in addition to FIGS. 2, 4 and 5, the distillation assembly 212, in one embodiment, includes the distiller 216 and the conduit 218 connected to the distiller 216 at the first end 220 and the container 106 for the contaminated solvent solution 300 at the second end 222. It is within the teachings of the present disclosure that the distiller 216 may be constructed in any suitable manner from any suitable material. For example, the distiller 216 may be constructed from component pieces or a monolithic construction, and stamping, forming, casting, forging, welding, mechanical fasteners, molding, bonding or other methods of construction many be used in connection with metal, plastic, composite materials or other like materials. In one embodiment, the distiller 216 is preferably constructed of component pieces formed of metal, preferably carbon steel, galvanized steel or other like suitable material, or plastic in a modular, non-welded construction. Such component pieces may include a top plate 348, a bottom plate 350, a tube 352 disposed between the top plate 348 and the bottom plate 350 and a fastener 353 that extends between the top plate 348 and the bottom plate 350 and retains the tube 352 between the top plate 348 and the bottom plate 350. A distillation chamber 354 is collectively defined between the top plate 348, the bottom plate 350 and the tube 352. It is within the teachings of the present invention that the tube 352 may have any suitable configuration. For example, the tube 352 may have a cylindrical, multi-sided, oval or other suitable configuration to facilitate the intended functionality. Preferably, the tube 352 has a cylindrical configuration of a standard size in order to reduce costs and manufacturing complexity. Optionally, a seal 356 may be disposed between each end of the tube 352 and the top and bottom plates 348, 350 to increase the sealing capacity of the distillation chamber 354 when a pressure greater than ambient is created in the recycling or distillation process. It is within the teachings of the present disclosure that the seal 356 may have any suitable configuration or material of construction to facilitate the intended functionality. In one embodiment, the fastener 353 may include a plurality of component pieces, such as, for example, a threaded rod 358, washer 360 and nut 362. Alternatively, a bolt, washer and nut assembly or other like mechanical fastening assembly may be likewise useful as the fastener 353. An insulation jacket may be included as part of the distiller 216 in one embodiment. It is within the teachings of the present disclosure that the insulation may be any suitable configuration or construction to perform the intended function. Preferably, the insulation surrounds and forms the outer perimeter of the distiller 216.

A longitudinal axis 364 of the distiller 216 is defined collinear along the longitudinal axis of the tube 352 and the top and bottom plates 348, 350 are disposed normal to the longitudinal axis 364. The distiller 216 is connected to the bottom wall 290 of the recycler module 204 such that the longitudinal axis 364 is non-vertical or otherwise at an angle 366 to a vertical reference line 368, as shown in FIG. 2. In order to facilitate such an orientation, the bottom wall 290 includes a pocket 291 for mounting the distiller 216 that may include a primary surface 368 to connect the bottom plate 350 (or mounting flanges or brackets connected to the bottom plate 350) substantially parallel to the primary surface 368. Such an orientation facilitates contaminate removal from the distiller 216 because, in one embodiment, a column port 370 is preferably formed in the bottom plate 350. A fitting 372 may be connected to the column port 370 to facilitate a quick-release fluid-tight connection to the conduit 276 of the lock-out assembly 270.

In one embodiment, the top plate 348 may include the following removably connected components: the conduit 218, the pressure relief valve 224, a heating element 372 and a temperature sensor 374. Preferably, the conduit 218 includes, in one embodiment as shown in FIG. 2, in series, the first end 220 connected to the top plate 348 of the distiller 216 in communication with the distillation chamber 354 through a baffle 378, as described herein, a first portion 376 that extends from the first end 220 and is disposed within the duct 310, a second portion 380 that extends from the first portion 376 and is disposed external to the duct 310, a third portion 382 that extends from the second portion 380 and defines the condenser 342, as discussed herein, a fourth portion 384 that extends from the third portion 382 and includes a sight glass 386 that is disposed external to the duct 310 at the front 330 of the recycler module 204 and the second end 222 that extends from the fourth portion 384. In one embodiment, the first portion 376 may include a loop or similar bend, turn or like path of the conduit 218 into the duct 310. It is within the teachings of the present disclosure that the location of the first portion 376 within the duct 310 aids in the cooling of the solvent that has been boiled off or recycled from the distillation chamber 354, especially when the source of air flow 328 has been activated.

In one embodiment, as shown in FIG. 2 the condenser 342 is disposed wholly within the duct 310 immediately adjacent the source of air flow 328 and is configured substantially as a cylindrical cone aligned substantially about the axis of rotation 336. It is within the teachings of the present disclosure that the condenser 342 may have any suitable configuration or construction. For example, extending from the second portion 380 disposed external to the duct 310, the conduit 218 enters the duct 310 and spirals about the axis of rotation 336 increasing in diameter and losing altitude with respect to the source of air flow 328 with each revolution. Optionally, the conduit 218 that defines the condenser 342 may also include fins 388 to increase the heat transfer capacity which aids in the condensation of the solvent from a gas to a liquid.

In one embodiment as shown in FIGS. 2, 4 and 5, the sight glass 386 may be disposed external to the duct 310, below the access panel 340 and above the filter 338 or intake port 296 and may include an in-line fitting connected to the conduit 218 that has a section or window 390 that permits inspection of an interior of the sight glass 386. The sight glass 386 is preferably also disposed behind the door 282 but visible to an operator with opening the door 282. Preferably, the sight glass 386 is useful for determining the presence of air in the conduit 218. It is within the teachings of the present disclosure that preferred operation of the assembly 200 is a closed system in connection with the source of contaminated solvent solution 100. The presence of air in the conduit 218 decreases the efficiency of the assembly 200. Accordingly, the sight glass 386 provides improved functionality in connection with the priming and operation of the assembly 200, as discussed herein.

In one embodiment, the pressure relief valve 224, as is commonly understood in the art, is connected directly to an aperture in the top plate 348 of the distiller 216. Accordingly, the pressure relief valve 224 is in direct communication with the distillation chamber 354 such that the pressure relief valve 224 is more quick to act than one that might be disposed at a location remote to the distillation chamber 354. Such a configuration increases the safety to the operator, particularly when used in connection with the tube 226, as described herein. Preferably, a baffle 378 is disposed adjacent a port connected to the conduit 218, but not adjacent the pressure relief valve 224. It is within the teachings of the present disclosure that the baffle 378 may have any suitable configuration or construction. For example, in one embodiment, the baffle 378 may be configured as a tortuous path or other like structure to perform the intended functionality. Such a baffle 378 prevent contaminants from easily reaching the conduit 218, thus recycling only the solvent and thereby reducing the contaminants in the contaminated solvent solution 300. One of ordinary skill in the art will recognize that a baffle-like device is not useful in connection with the pressure relief valve where a quick reduction is over pressure is desired.

In one embodiment, the heating element 372 is removably connected to the top plate 350 of the distiller 216 for independent replacement. It is within the teachings of the present disclosure that such removable connection may be configured and construction is any suitable manner. For example, in one embodiment, the heating element 372 may be connected to a flange 392 that is sealingly connected to the top plate 350 by a suitable seal 438 such as an appropriate O-ring or similar device. Increased serviceability, decreased maintenance downtime and ease of manufacture are the benefits of such construction.

A common disadvantage of current devices that recycle solvent from a contaminated solvent solution is that malodors are formed as a result of the process for recycling the solvent from the contaminated solvent solution. The source of the malodors is an improperly designed and operated distiller, namely, a heating element disposed above the contaminated solvent solution that is exposed to a contaminate film. No matter how well constructed or sealed, the malodors will exit the distiller via the condensate or the condensate line. It is further within the teachings of the present disclosure that the heating element 372 may be configured and/or constructed in any suitable manner to perform the intended functionality. For example, the heating element 372 may include an active portion 394, an inactive portion 396 and a bridge element 398 that generally may separate the active portion 394 from the inactive portion 396. The active portion 394 is activated by a controller 402 to increase and maintain the temperature of the active portion 394 at a desired level. However, the inactive portion 396 is not activated to increase the temperature thereof. Preferably, during operation, as described herein, the contaminated solvent solution 300 is disposed at a level 400 within the distiller 216 such that the active portion 394 is always below the level 400. Alternatively, the contaminated solvent solution 300 is disposed at the level 400 within the distiller 216 that is no lower than the bridge element 398. In both of the foregoing configurations and other like configurations the active portion 394 vaporizes only the solvent because although the level 400 may rise and fall, the active portion 394 is disposed adjacent the bottom of the distillation chamber 354 and a sensor 404 for measuring the temperature of the bridge element 398 in connection with the controller 402 to prevent activation of the active portion 394 when the level 400 might expose the active portion 394 such as shown by dashed level 400 shown in FIG. 6. The foregoing is important because a film formed of contaminants from the contaminated solvent solution may be disposed on the inactive portion 396 above the level 400. However, since the temperature of the inactive portion 396 is not increased as in the active portion 394 the film will not burn off and form malodors. Preferably, the active portion 394, when activated by the controller 402, increases and maintains the temperature of the contaminated solvent solution 300 disposed in the distiller above a boiling temperature for the solvent and below an offset from an auto-ignition temperature for the solvent, thereby generating a vapor constituted of the solvent substantially without contaminants from the contaminated solvent solution 300. Operation in accordance with the foregoing is safe and does not produce undesirable malodors.

Figure 8:
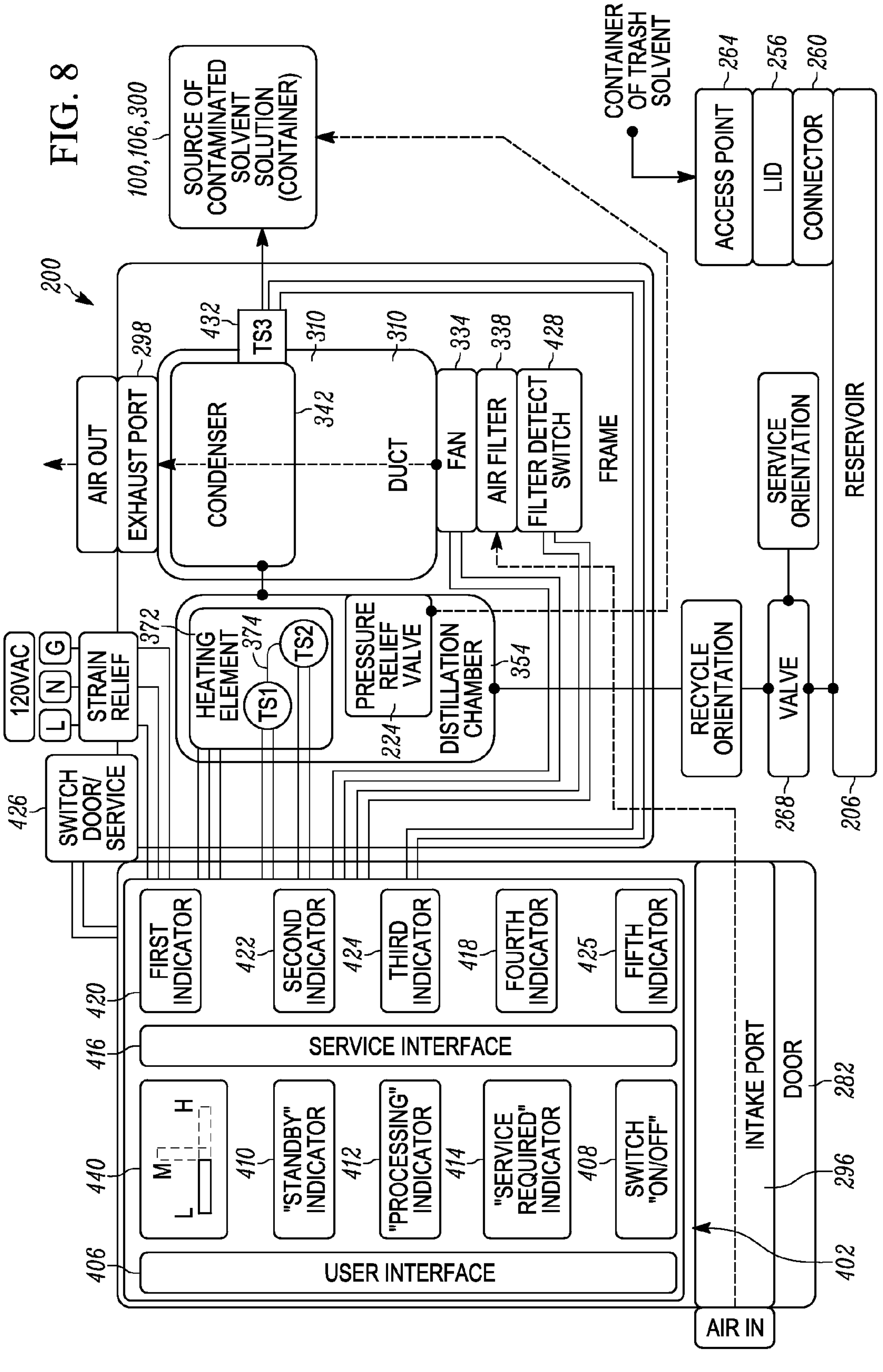
FIG. 8 is a schematic view of the assembly for recycling the contaminated solvent solution of FIG. 1.

FIG. 8 is a schematic view of the assembly 200 for recycling the contaminated solvent solution of FIG. 1. The structural components of the assembly that are shown in this FIG. 8 have been described herein and will not be repeated for the sake of brevity. However, FIG. 8 also aptly illustrates the connectivity and functionality of the controller 402. It is within the teachings of the present disclosure that the controller 402 may be configured and/or constructed in any suitable manner to perform the intended functionality. For example, the controller 402 may be a device controller, digital controller, analog controller, chip, card, programmable logic controller, microcontroller, proportional-integral-derivative controller or any other suitable device that is used for automation of an electromechanical processes or to facilitate extensive input/output (I/O) arrangements. Preferably, the controller 402 includes a processor that may be, but not limited to, a single processor, plurality of processors, a DSP, a microprocessor, ASIC, state machine, or any other implementation capable of processing and executing software. The term processor should not be construed to refer exclusively to hardware capable of executing software, and may implicitly include DSP hardware, ROM for storing software, RAM, and any other volatile or non-volatile storage medium. Further, the controller 402 preferably includes memory that may be, but not limited to, a single memory, a plurality of memory locations, shared memory, CD, DVD, ROM, RAM, EEPROM, optical storage, microcode or any other non-volatile storage capable of storing digital data for use by the processor. In one embodiment, the controller 402 may be a microcontroller. Preferably, the controller 402 may include a set or sets of instructions to perform all of the following functions as described herein. It is within the teachings of the present disclosure that the instructions may be set forth in any suitable language or form in order to perform the intended functionality. Accordingly, for the sake of brevity this disclosure will not describe the exact instruction, but will rather describe the intended functionality of various aspects of the controller 402 below.

The controller 402 may include a user interface 406 that is preferably disposed such that the user interface 406 is visible to the operator when the assembly 200 is disposed in recycle mode, as discussed herein. The user interface 406 may include, in one embodiment, a power or on/off switch 408, a standby indicator 410 (representative of the controller 402 operation of a rest period), a processing indicator 412 (representative of the controller 402 operation of a distillation cycle) and a service required indicator 414 (representative of the controller 402 operation of a service period wherein the recycler module 204 is deactivated). It is within the teachings of the present disclosure that the standby, processing and service required indicators may have any suitable configuration or construction to perform the intended functionality. For example, the standby, processing and service required indicators may be light emitting diodes, lamps, visual indicators, audible indicators or any other suitable device. It is within the further teachings of the present invention that the user interface 406 may include additional functionality. For example, any indicators, information or functionality of the service interface, as described herein, may also be provided through the user interface, if so desired, with or without security. Preferably, the power or on/off switch 408 is actuated by the operator to cycle the assembly 200 between an operative state and an inoperative state by closing or opening the switch 408, respectively. Additionally, the processing indicator 412 may be preferably activated whenever a distillation cycle is in process. The distillation process may be defined as: power is applied to the heating element for a period as described herein, then a cool-down period completes the process (preferably when the temperature in the distillation chamber is lower than 350° F.). The processing indicator 412 is preferably deactivated if either of the standby indicator 410 or service required indicator 414 are activated. Further, the standby indicator 410 may be preferably activated for a delay period or rest period between distillation cycles (the time period of the delay period or rest period is determined by the position of the duty selector switch 440 that is located on the inside of the front door) or the service required indicator 414 is activated. The standby indicator 412 may be deactivated when the assembly 200 is in the processing mode or during a distillation cycle. Moreover, the service required indicator 414 may be preferably activated whenever a system error has been detected (any service interface indicator is activated) and when the door is disposed in an open position. In one embodiment, all distillation processing will stop when an error is detected. The service required indicator 414 may be deactivated if there are no system or service interface errors and the door is disposed in the closed position.

The controller 402 may also include a service interface 416 that is preferably disposed such that the service interface 416 is not visible to the operator except when the door 282 is moved from a closed position to an open position and the mode switch 426 is opened, such as when the assembly 200 is disposed in the service mode, as discussed herein. The service interface 416 may include, in one embodiment, a first indicator 420, a second indicator 422, a third indicator 424, a fourth indicator 418 and a fifth indicator 425. It is within the teachings of the present disclosure that the first, second, third, fourth and fifth indicators 418, 420, 422, 424, 425 may have any suitable configuration or construction to perform the intended functionality. For example, the first, second, third, fourth and fifth indicators 418, 420, 422, 424, 425 may be light emitting diodes, lamps, visual indicators, audible indicators or any other suitable device. Preferably, the first, second, third, fourth and fifth indicators 418, 420, 422, 424, 425 perform at least multiple functionality. For example, the first indicator 420 may be disposed in at least one of three states: off, indicating that there is no error; flashing, indicating that there is a condenser coil temperature error (e.g., the measured temperature is greater than 125° F. continuously for ten seconds or more; or solid, indicating that there is a condenser coil temperature probe break for one second or more. Additionally, the second indicator 422 may be disposed in at least one of three states: off, indicating that there is no error; flashing, indicating that there is contaminant detection (e.g., the cool down period takes more than fifty minutes to cool down to 350° F., which indicates that it is time to change the waste reservoir); or solid, indicating that there is a heating element over-temperature (e.g., the distillation temperature is greater than the maximum temperature of 461° F. for one second or more). Further, the third indicator 424 may be disposed in at least one of three states: off, indicating that there is no error; flashing, indicating that there is a heating element probe difference (e.g., the temperature difference between the heating element probes, when more than one is used, is greater than 66° F. for ten minutes); or solid, indicating that there is a heating element probe break for one second or more. Moreover, the fourth indicator 418 may be disposed in at least one of three states: off, indicating that there is no error; flashing, indicating that there is clogging (e.g., power is applied and the heating element heat up time is less than twenty minutes to reach 461° F.); or solid, indicating that the heater element 372 temperature is not rising within limits (e.g., power is applied and the heating element did not rise in temperature within eight minutes or does not reach 461° F. in sixty minutes). Still further, the fifth indicator 425 may be disposed in at least one of two states: off, indicating that there is no error; or solid indicating that the filter is not installed properly. It is within the teachings of the present disclosure that additional functionality may be added to the service interface 416. For example, the following components and related functionality may be added: reset button/switch, electronic device interface port, printer, visual display or any other suitable device to perform related functionality.

The controller 402 may also interface with, in one embodiment, a 120 volt alternating current power source, the mode switch 426, the heating element 372, the temperature sensor 374, the source of air flow 328 or fan 334, a filter detect switch 428 and a second temperature sensor 432. It is within the teachings of the present disclosure that any suitable power source may be used to perform the intended functionality. For example, 12 or 24 volt direct current, 208, 220, 240 or 480 volt, single phase or multi-phase, alternating current or any other suitable power source may be used. In one embodiment, the mode switch 426 is made when the door 282 is disposed in a closed position and is open when the door 282 is disposed in an open position. It is within the teachings of the present disclosure that the mode switch 426 may not be linked to the operation of the door 282 between closed and open positions, but may rather be actuated by any other suitable manipulation. For example, an operator may be required to actuate the switch 426 or other movement within the assembly 200 may actuate the switch 426. Preferably, the mode switch 426 is used to toggle the assembly 200 between a recycle mode and a service mode, as discussed herein.

In one embodiment, the controller 402 receives an input signal from the temperature sensor 374 (that may be, in one embodiment, a pair of temperature sensors with a primary sensor and a redundant secondary sensor to ensure the actual state of the system is the state that is being reported by the primary sensor to the controller 402 and outputs a control signal to the heating element 372 by which the heating element 372 is activated and/or deactivated during the distillation cycle, rest period and/or service period. During the distillation cycle, preferably, the controller 402 functions to maintain the contaminated solvent solution 300 disposed in the distiller 216 above a boiling temperature for the solvent and below an offset from an auto-ignition temperature for the solvent. For example, in one embodiment, the solvent may be Safety-Kleen Premium 150™ solvent, which has been found to be a successful cleaning solvent in parts washers. Accordingly, the controller 402 may be programmed or otherwise configured to activate and/or deactivate the active portion 394 of the heating element 372 to maintain the contaminated solvent solution 300 that includes the Premium 150™ solvent disposed in the distiller 216 between 457° F. (the boiling temperature of the Premium 150™ solvent) and 461° F. (an offset of 18° F. from the auto-ignition temperature (480° F.) of the Premium 150™ solvent, as required by UL2208 for safe operation) so that only the Premium 150™ solvent is vaporized and any film formed of contaminants from the contaminated solvent solution disposed on the inactive portion 396 is not burned off, whereby malodors are avoided.

In one embodiment, the controller 402 may activate the source of airflow 328 or fan 334 so long as the controller 402 is connected to a suitable power source and the power switch 408 is disposed in the "on" position or to close the power circuit. Thereafter, the controller 402 will deactivate the source of airflow 328 or fan 334 when the filter detect switch 428 is opened indicating that the air filter 338 has been removed for service, as discussed herein. The second temperature sensor 432 may be used, in one embodiment, to monitor the temperature of the solvent upon exit from the condenser 342. If such temperature exceeds a predetermined threshold or set point, then the controller 402 may deactivate the assembly 200 and activate the service required indicator 414.

Figure 9:
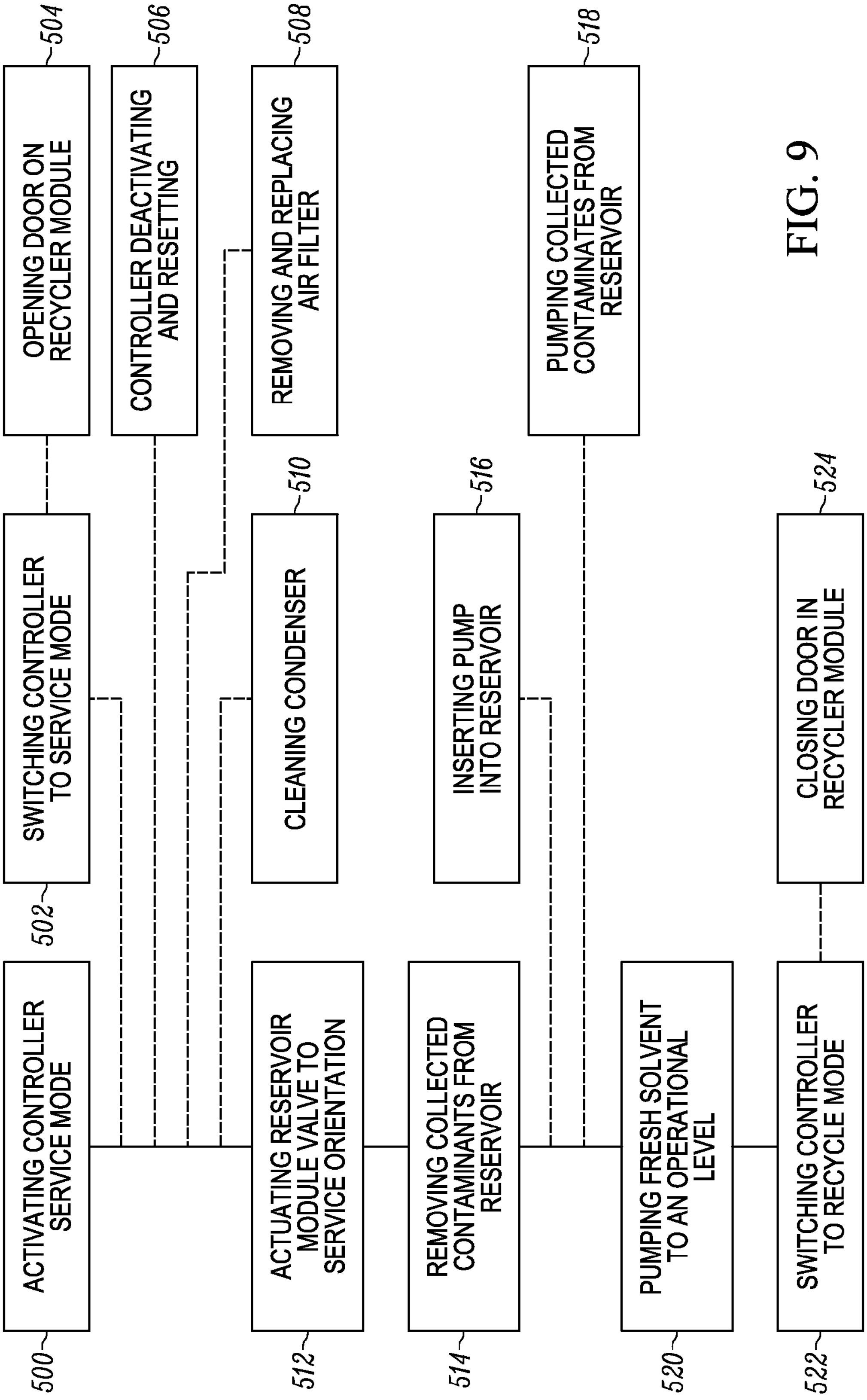
FIG. 9 is a flow chart illustrating a method of service for the assembly for recycling the contaminated solvent solution of FIG. 1.
Figure 11:
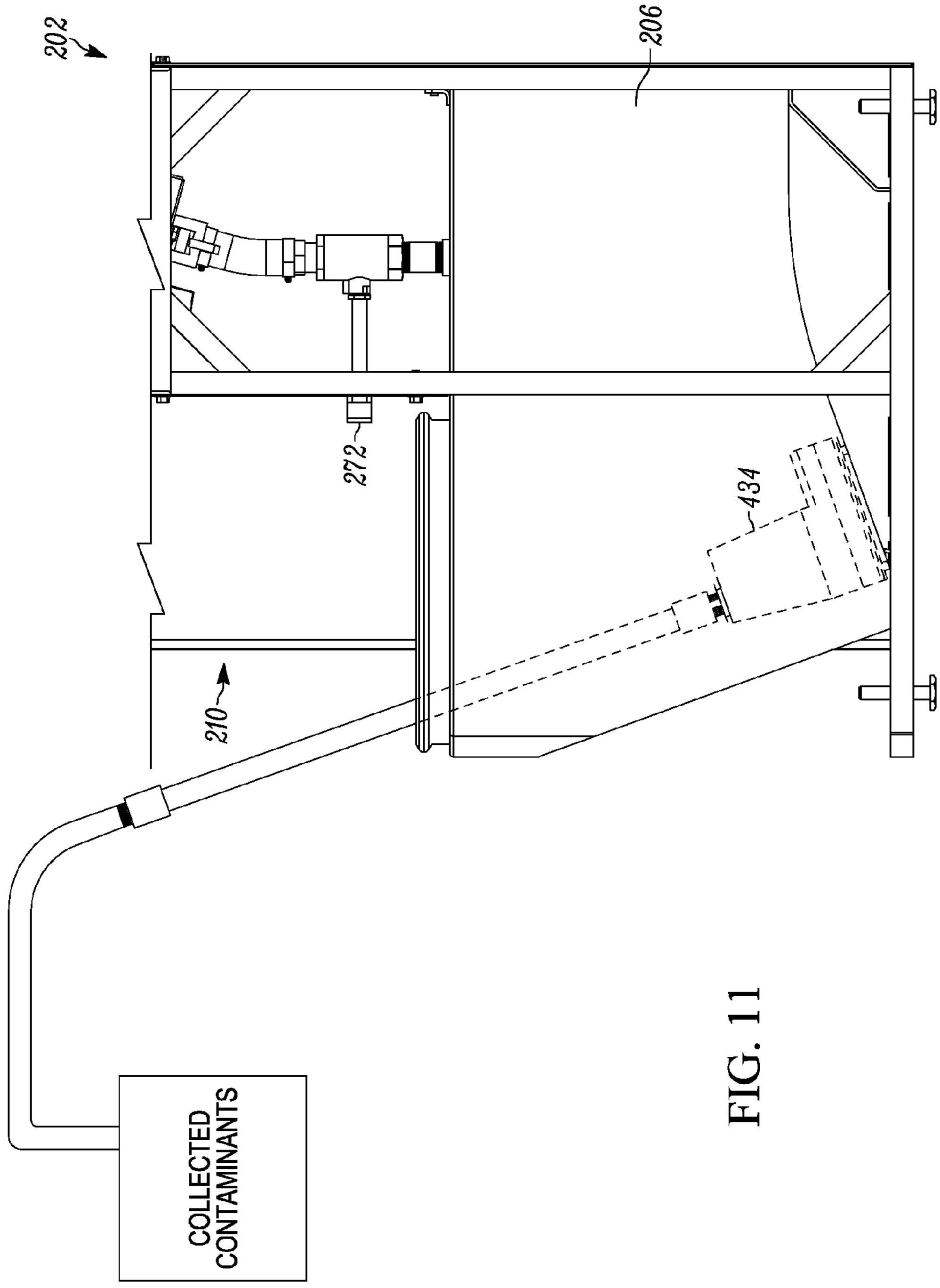
FIG. 11 is a schematic view of an assembly for servicing the assembly for recycling the contaminated solvent solution of FIG. 1.

FIG. 9 is a flow chart illustrating a method of service for the assembly 200 for recycling the contaminated solvent solution 300 of FIG. 1. In one embodiment, the method of servicing the assembly 200 constructed and/or configured as described herein may include activating a service mode in the controller 402 as illustrated in block 500. Optionally, activating the controller 402 service mode may be enacted by switching the controller 402 to the service mode as illustrated in block 502, which may also include opening the door 282 on the recycler module 204 as illustrated in block 504. In one embodiment, the step of activating the service mode may also include the controller deactivating the distillation assembly 212 and the air handler assembly 214 and resetting a recycle mode to the beginning as illustrated in block 506, removing and replacing the air filter 338 as illustrated in block 508 and/or opening the access panel 340 and cleaning the condenser 342 as illustrated in block 510. The method of servicing the assembly 200 may also include actuating the valve 268 from a recycle orientation to a service orientation, as described herein and illustrated in block 512. Optionally, the step of actuating the valve 268 may include opening the door or front portion 240 on the reservoir module 202. The method of servicing the assembly 200 may also include removing the collected contaminants from the reservoir 206 as illustrated in block 514. Optionally, as shown in FIG. 11 removing the collected contaminants from the reservoir 206 may include removing the connector 260 and lid 256 from the reservoir 206, inserting a submersible pump 434 into the reservoir 206 as illustrated in block 516 and pumping collected contaminants from the reservoir 206 by actuating the pump 434 after inserting into the reservoir 206 as illustrated in block 518. The method of servicing the assembly 200 may also include pumping fresh solvent into the reservoir 206, distiller 216 and conduit 218 to an operational level defined when the sight glass 386 is filled with solvent sufficient to displace air in the sight glass 386 as illustrated in block 520. Optionally, the pumping fresh solvent into the reservoir 206 may include connecting the pump 434 to the access port 264 on the lid 256 and immersing the pump 434 is a container 436 of fresh solvent. The method of servicing the assembly 200 may also include switching the controller 402 to a recycle mode as illustrated in block 522. Optionally, the switching the controller 402 to a recycle mode may include closing the door 282 on the recycler module 204.

Figure 10:
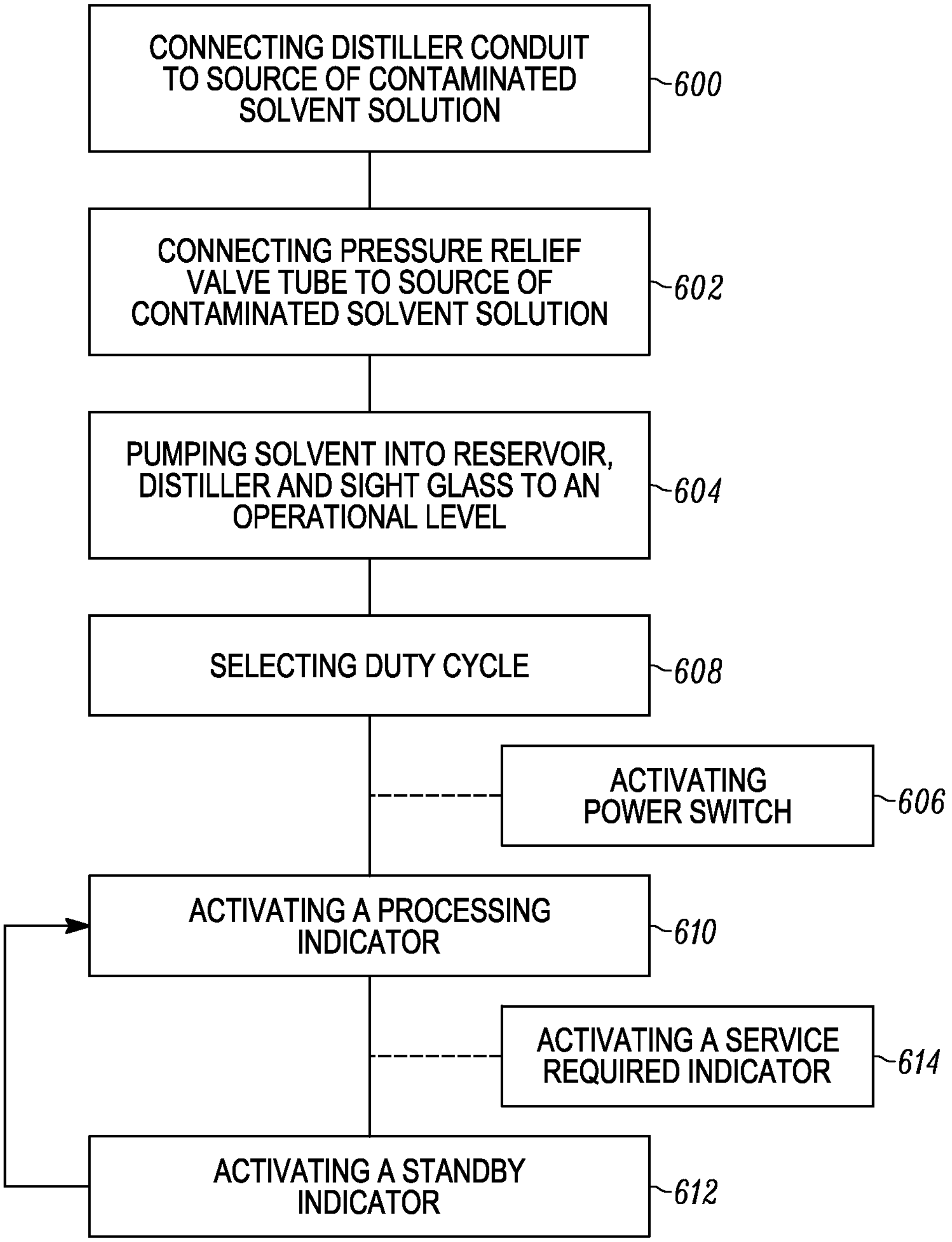
FIG. 10 is a flow chart illustrating a method of operation for assembly for recycling the contaminated solvent solution of FIG. 1.

FIG. 10 is a flow chart illustrating a method of operation for assembly 200 for recycling the contaminated solvent solution 300 of FIG. 1. In one embodiment, the method of operating the assembly 200 constructed and/or configured as described herein may include connecting the conduit 218 connected to the distiller 216 to the source 100 of contaminated solvent solution 300 such that a distal end of the conduit 218 is disposed below the level 302 of the contaminated solvent solution in the source 100 as illustrated in block 600. The method of operating the assembly 200 may also include connecting the tube 226 connected to the pressure relief valve 224 to the source 100 of contaminated solvent solution 300 such that a distal end of the conduit 218 is disposed below the level 302 of the contaminated solvent solution in the source 100 as illustrated in block 602. The method of operating the assembly 200 may also include pumping solvent into the reservoir 206, distiller 216 and conduit 218 to an operational level defined when the sight glass 386 is filled with solvent sufficient to displace air in the sight glass 386 as illustrated in block 604. Optionally, the pumping solvent into the reservoir 206 may include connecting the pump 434 to the access port 264 on the lid 256 and immersing the pump 434 is a container 436 of solvent. The method of operating the assembly 200 may also include selecting a duty cycle with duty selector switch 440 (see FIGS. 5 and 8) to regulate a rest period after the controller 402 operation of a distillation cycle as illustrated in block 608. It is within the teachings of the present disclosure that the duty cycle may be defined in any suitable manner for the intended functionality. For example, a single duty cycle may include the distillation cycle and the rest period. Preferably, the controller 402 may be programmed with instructions such that the duty cycle may be selected from one of at least possible selections to generate what may commonly be referred to as a low, medium and high processing rate by actuation of the duty selector switch 440. Generally, the processing rate is relative to the amount of contaminated solvent solution 300 that the operator desires to process in one day and/or the volume of contaminated solvent solution 300 disposed in the container 106. For example, selection of a medium duty cycle ("M" on the duty selector switch 440) will result in the assembly 200 processing less solvent over a twenty four hour period than the selection of a high duty cycle ("H" on the duty selector switch 440) but more solvent processed over the same period than the low duty cycle ("L" on the duty selector switch 440). In one embodiment, the duty cycle may be selected by an operator, but the operator may wish to restrict access to making such a selection and accordingly restrict access to only certain individuals, such as manufacturers representatives or service personnel.

It is further within the teachings of the present disclosure that the distillation cycle may be defined in any suitable manner for the intended functionality. For example, the distillation cycle may include a period of time during which the controller 402 alternately activates and deactivates the heating element 372 in order to maintain the contaminated solvent solution 300 between desired temperatures so as to recycle or process the solvent, as described herein, in order to perform the intended functionality. It is still further within the teachings of the present disclosure that the rest period may be defined in any suitable manner for the intended functionality.

For example, the rest period may include any suitable time period during which the controller 402 deactivates the heating element 372 so that the vaporized solvent may expand from the distillation chamber 354 through the conduit 218 where it is condensed and return to the container 106. Since the distiller 216, conduit 218 and container 106 form a closed system, when the distillation chamber 354 cools a vacuum is created that draws contaminated solvent solution 300 from the container 106 into the distillation chamber 354 so that another distillation cycle can begin.

Optionally, selecting a duty cycle may include activating the power switch 408 as illustrated in block 606. The method of operating the assembly 200 may also include activating the processing indicator 412 during the controller operation of the distillation cycle as illustrated in block 610. Optionally, the method of operating the assembly 200 may include the controller 402 activating the service required indicator 414 in the event the controller 402 activates any of the first, second, third or fourth indicators 420, 422, 424, 418 to a flashing or solid state as illustrated in block 614. The method of operating the assembly 200 may also include activating the standby indicator 410 during the controller operation of the rest period as illustrated in block 612.

The preceding detailed description is merely some examples and embodiments of the present disclosure and that numerous changes to the disclosed embodiments can be made in accordance with the disclosure herein without departing from its spirit or scope. The preceding description, therefore, is not meant to limit the scope of the disclosure but to provide sufficient disclosure to one of ordinary skill in the art to practice the invention without undue burden.

What is claimed is:

1. An assembly for removing contaminants from objects and recycling a solvent from a contaminated solvent solution comprising: a parts washer assembly including a portion for removing contaminants from objects connected to a container for a contaminated solvent solution; and a recycling assembly including a reservoir module connected to a recycler module; the reservoir module including a reservoir mounted therein; the reservoir including a side wall, a bottom wall and a top wall that define an interior volume and a removable lid; the lid including a first portion that extends below the top wall into and reduces the interior volume and an access port disposed in the first portion; the recycler module including a distillation assembly and an air handler assembly; the distillation assembly including a distiller and a conduit connected to the distiller and the container for the contaminated solvent solution; the conduit including a condenser and a sight glass; the air handler assembly including a duct having an intake port, an exhaust port and a source of air flow connected to the duct; wherein the condenser is disposed within the duct and the sight glass is disposed external to the duct, wherein the conduit includes, in series, a first portion adjacent the distiller that is disposed within the duct, a second portion that is disposed external to the duct and a third portion that defines the condenser.

2. The assembly as recited in claim 1, wherein the bottom wall includes a back edge disposed above a front edge.

3. The assembly as recited in claim 1, further comprising a substantially vertically aligned conduit that connects the reservoir and the distiller.

4. The assembly as recited in claim 1, further comprising a lock-out including a valve having a handle connected to a conduit that connects the reservoir and the distiller that prevents removal of the lid when the handle is disposed in an open position and permits removal of the lid when the handle is disposed in a closed position.

5. The assembly as recited in claim 1, further comprising a slot formed in a bottom wall of the recycler module that defines an inlet pathway between an exterior of the recycler module and an interior of the recycler module and an opening in the duct adjacent the distiller that defines an outlet pathway between the interior of the recycler and the exterior of the recycler module thereby defining an ambient cooling passageway.

6. The assembly as recited in claim 1, wherein the recycler module further comprises a cover including an inlet opening disposed aligned in registration with the intake port and an outlet opening disposed aligned in registration with the exhaust port.

7. The assembly as recited in claim 1, wherein the recycler module further comprises a cover including a crowned top.

8. The assembly as recited in claim 1, wherein the distiller further comprises a modular, non-welded construction.

9. The assembly as recited in claim 1, wherein the distiller further comprises a top plate, a bottom plate, a tube disposed between the top plate and the bottom plate, that collectively define a distillation chamber, and a fastener that extends between the top plate and the bottom plate and retains the tube therebetween.

10. The assembly as recited in claim 1, wherein the distiller further comprises a baffle disposed adjacent a port connected to the conduit.

11. The assembly as recited in claim 1, wherein the distiller has a longitudinal axis disposed non-vertical.

12. The assembly as recited in claim 11, wherein the distiller further comprises a top plate and a bottom plate disposed normal to the longitudinal axis.

13. The assembly as recited in claim 1, wherein the distiller further comprises a heating element that, when activated, maintains the contaminated solvent solution disposed in the distiller above a boiling temperature for the solvent and below an offset from an auto-ignition temperature for the solvent.

14. The assembly as recited in claim 13, wherein the heating element is removably connected to a top plate for independent replacement.

15. The assembly as recited in claim 1, further comprising a pressure relief valve in direct communication with a distillation chamber defined within the distiller.

16. The assembly as recited in claim 1, wherein the duct includes a panel disposed adjacent to the condenser and removably connected to the duct to facilitate access to the condenser.

17. The assembly as recited in claim 1, wherein the solvent is selected from the group consisting of a hydrocarbon-based solvent, a petroleum-based solvent, N-Methyl-2-pyrrolidone and butanone.

18. An assembly for removing contaminants from objects and recycling a solvent from a contaminated solvent solution comprising: a parts washer assembly including a portion for removing contaminants from objects connected to a container for a contaminated solvent solution; and a recycling assembly including a reservoir module connected to a recycler module; the reservoir module including a reservoir mounted therein; the reservoir including a side wall, a bottom wall and a top wall that define an interior volume and a removable lid; the lid including a first portion that extends below the top wall into and reduces the interior volume and an access port disposed in the first portion; the recycler module including a distillation assembly and an air handler assembly; the distillation assembly including a distiller and a conduit connected to the distiller and the container for the contaminated solvent solution; the conduit including a condenser and a sight glass; the air handler assembly including a duct having an intake port, an exhaust port and a source of air flow connected to the duct; wherein the condenser is disposed within the duct and the sight glass is disposed external to the duct, wherein the source of airflow is a fan disposed within the duct and wherein the fan includes an axis of rotation disposed substantially vertical and the condenser includes a conical configuration aligned substantially symmetrical about the axis of rotation.

* * * * *